United States Patent [19]

Bookout et al.

[11] 4,331,044
[45] May 25, 1982

[54] FOUR SPEED OFFSET AUTOMATIC OVERDRIVE TRANSMISSION WITH LOCKUP IN DIRECT AND OVERDRIVE

[75] Inventors: Charles C. Bookout, Orchard Lake; Thomas R. Stockton, Ann Arbor, both of Mich.

[73] Assignee: Ford Motor Company, Dearborn, Mich.

[21] Appl. No.: 149,063

[22] Filed: May 12, 1980

[51] Int. Cl.³ .................... F16H 47/08; F16H 37/00; F16H 57/10
[52] U.S. Cl. ......................................... 74/688; 74/740; 74/762
[58] Field of Search ................. 74/688, 762, 740, 763, 74/677, 694, 695, 700, 701, 758, 759

[56] References Cited

U.S. PATENT DOCUMENTS

| 3,158,040 | 11/1964 | Moore | 74/759 X |
|---|---|---|---|
| 3,246,541 | 4/1966 | General | 74/677 |
| 3,270,585 | 9/1966 | Livezey | 74/677 |
| 3,300,001 | 1/1967 | Stockton | 192/4 |
| 3,314,307 | 4/1967 | Egbert | 74/688 |
| 3,446,094 | 5/1969 | Ohno et al. | 74/701 X |
| 3,446,095 | 5/1969 | Bookout | 74/695 X |
| 3,455,185 | 7/1969 | Ohno et al. | 74/701 X |
| 3,482,469 | 12/1969 | Mori | 74/759 X |
| 3,494,223 | 2/1970 | Mori | 74/688 |
| 3,577,805 | 5/1971 | Ohno et al. | 74/695 X |
| 3,701,623 | 10/1972 | Mori et al. | 74/763 |
| 4,224,837 | 9/1980 | Croswhite | 74/763 X |

FOREIGN PATENT DOCUMENTS

| 2743583 | 4/1979 | Fed. Rep. of Germany | 74/762 |
|---|---|---|---|
| 2830543 | 1/1980 | Fed. Rep. of Germany | 74/677 |

Primary Examiner—Leslie Braun
Attorney, Agent, or Firm—Donald J. Harrington; Keith L. Zerschling

[57] ABSTRACT

A transaxle driveline for a wheeled vehicle having an engine and gear system on a common axis that is transverse with respect to the center plane of the vehicle and having tandem driveshafts for the traction wheels, a differential gear mechanism mounted on a countershaft situated in parallel relationship with respect to the axis of the engine, the differential drive gearing being located between multiple ratio planetary gear elements of the driveline and a hydrokinetic torque converter and a compact clutch-and-brake arrangement for various ratios in the multiple ratio gear system within a transmission housing having a minimum axial dimension, the gearing being adapted to provide four forward driving ratios including an overdrive ratio and a direct drive ratio, the latter having three operating modes, one of which is fully mechanical, one of which is hydrokinetic and the third of which is characterized by a split torque delivery path that is partly hydrokinetic and partly mechanical.

2 Claims, 4 Drawing Figures

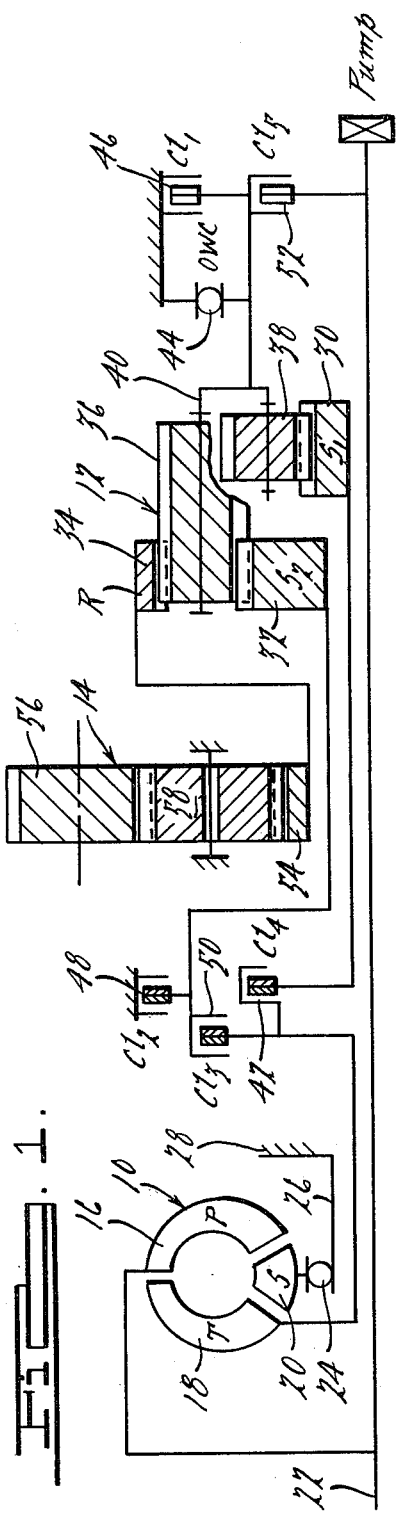

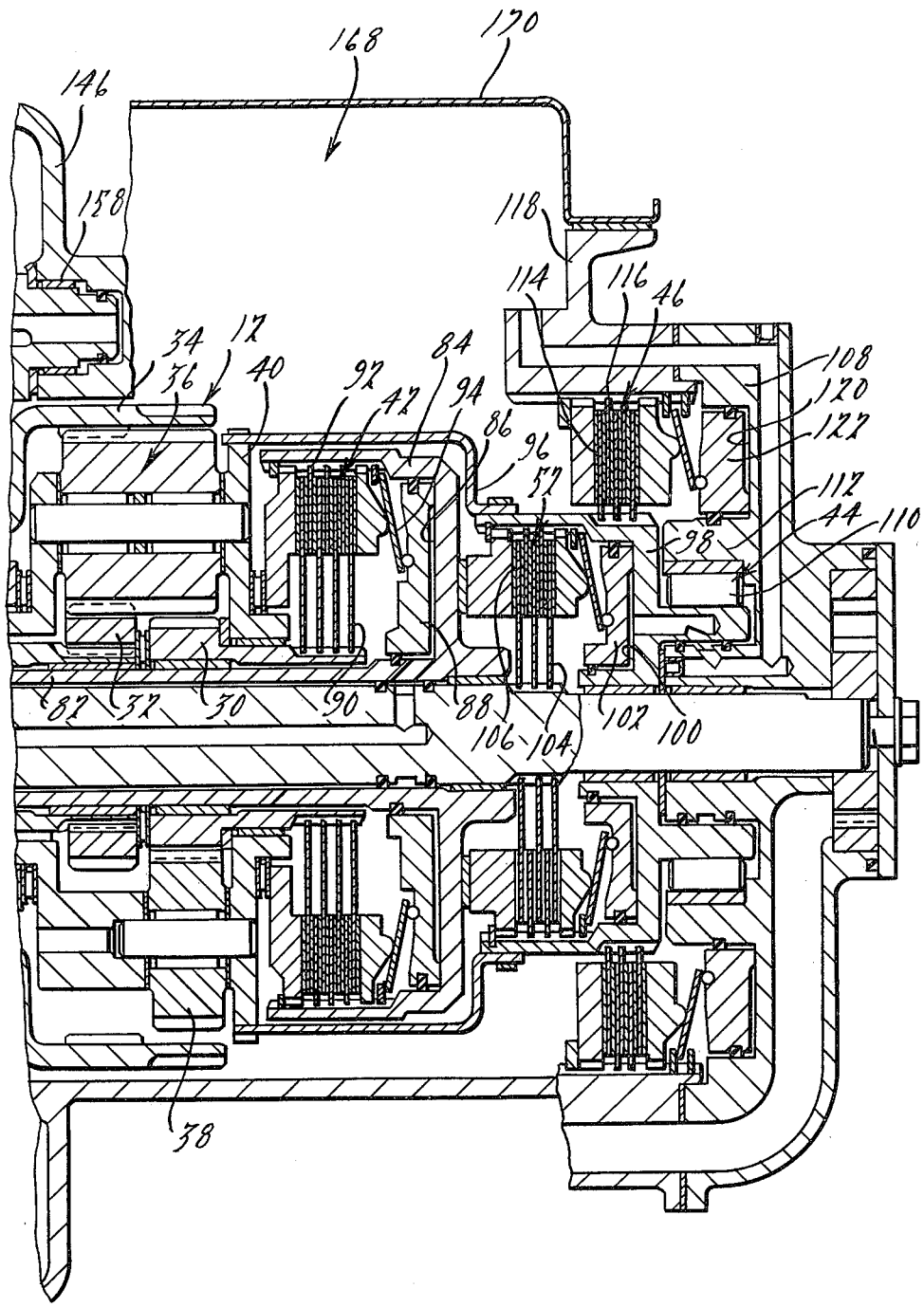

FOUR SPEED OFFSET AUTOMATIC OVERDRIVE TRANSMISSION WITH LOCKUP IN DIRECT AND OVERDRIVE

GENERAL DESCRIPTION OF THE INVENTION

Our invention comprises improvements in a gear system of the type shown in Egbert U.S. Pat. No. 3,314,307, Stockton U.S. Pat. No. 3,300,001 and Ohno et al U.S. Pat. No. 3,455,185. The gear system of the present disclosure, as in the three references identified here, employs a gear system having two sun gears, a double set of planet pinions and a ring gear output member. The clutch-and-brake arrangement is situated in a compact arrangement to provide two underdrive ratios, a third direct drive ratio which has three operating modes and an overdrive fourth ratio. The torque delivery path for the overdrive ratio is fully mechanical. By proper selection of the clutch and brake elements, the third gear ratio can be fully mechanical also, but it is capable also of direct drive operation with a hydrokinetic torque converter in the torque delivery path. In a third gear ratio operating mode during direct drive a portion of the torque is delivered hydrokinetically and the balance is distributed mechanically, thereby reducing the converter slip and hydrokinetic losses considerably.

The output element of the gear system is connected to torque transfer gearing having an input element coaxially arranged with respect to the axis of the gearing at a location between the multiple ratio gearing and the torque converter. The strategic positioning of the torque transfer gearing makes it possible to use a differential gearing mechanism for connecting the output element of the torque transfer gearing to each of two axle shafts in such a way that the operating angle of the axes of the axle shafts is relatively small, thereby making it possible to use constant velocity universal joints of known construction and to use simplified vehicle traction wheel suspensions.

BRIEF DESCRIPTION OF THE FIGURES OF THE DRAWINGS

FIG. 1 shows a schematic diagram of the torque delivery elements of the transaxle of our invention.

FIG. 2 is a chart that shows the engagement and release pattern for the clutches and brakes for the transmission system of FIG. 1.

FIGS. 3A and 3B show in cross-sectional form an assembly corresponding to the schematic diagram of FIG. 1.

PARTICULAR DESCRIPTION OF THE INVENTION

Figure 3A:
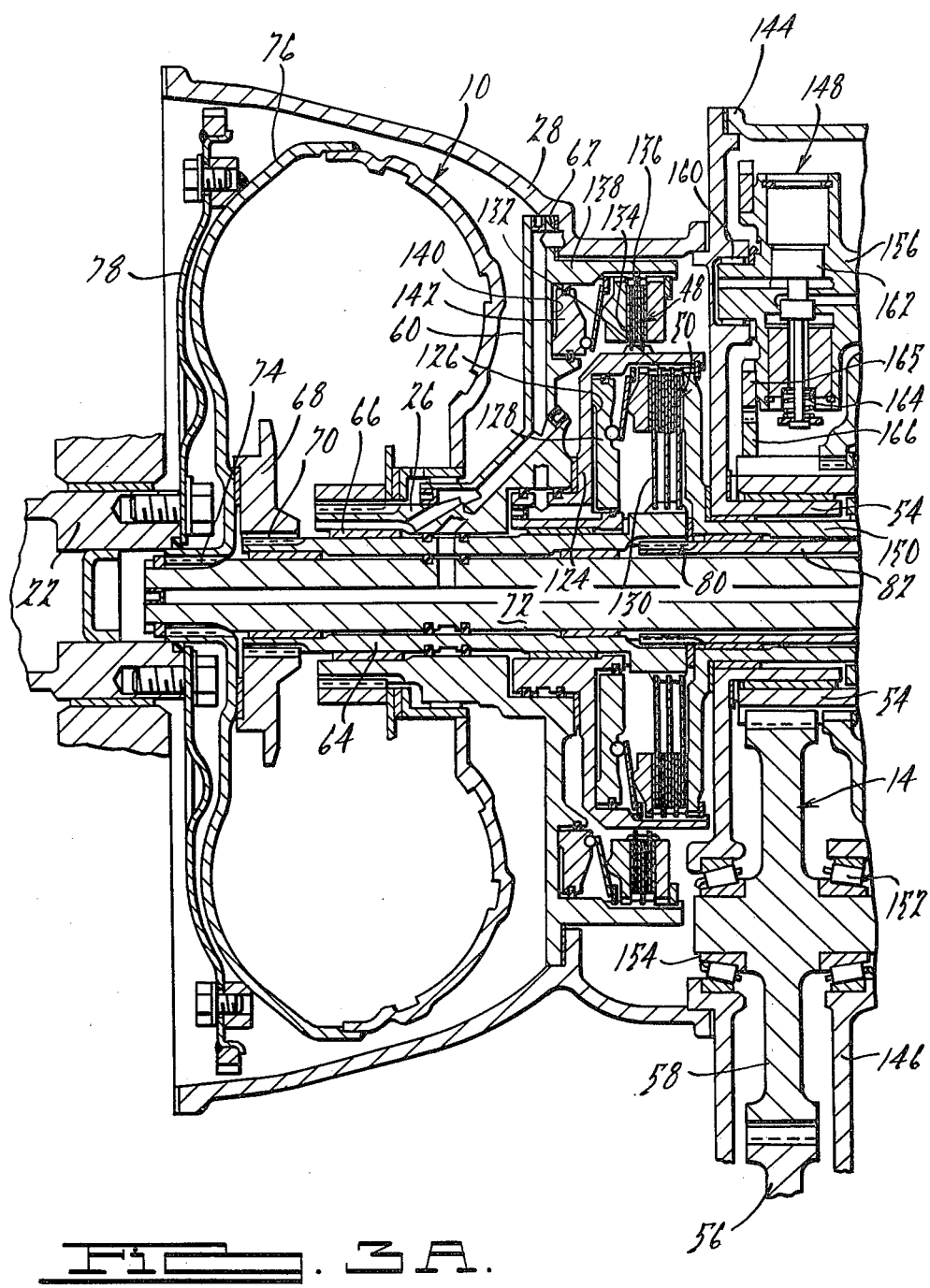

In FIG. 1 reference numeral 10 designates generally a hydrokinetic torque converter, reference numeral 12 designates generally multiple ratio gearing, and reference character 14 designates generally transfer drive gearing for a differential-and-axle assembly.

Converter 10 includes a bladed impeller 16, a bladed turbine 18 and a bladed stator 20. The impeller, the turbine and the stator are arranged in a torus circuit in the usual fashion and the impeller 16 is connected to the crankshaft 22 of an internal combustion engine, not shown. Stator 20 is adapted to be braked by overrunning brake 24 to a stationary sleeve shaft 26 connected to transmission housing 28. The stator 20 is anchored against the housing during operation of the converter in the torque conversion range, but it freewheels in known fashion during operation of the converter in the coupling range.

The gearing 12 includes a first sun gear 30, a second sun gear 32, a ring gear 34 and two sets of planet pinions 36 and 38. The pinions are journalled on a common carrier 40 so that pinions 38 engage sun gear 30 and pinions 36 engage ring gear 34. Pinions of each set also engage each other. The sun gear 30 is adapted to be connected to the turbine 18 through selectively engageable friction clutch 42 to establish low speed ratio operation. Carrier 40 at that time acts as a reaction member since it is braked by an overrunning brake 44. If coast braking or hill braking is desired, a friction brake 46 can be applied to anchor the carrier 40.

To establish a second underdrive speed ratio, sun gear 32 is braked by brake 48. At that time the overrunning coupling 44 freewheels. Clutch 50 is applied along with clutch 52 to establish a direct, fully mechanical drive from the crankshaft to the ring gear 34. If only the clutches 42 and 50 are applied and clutch 52 is released, a direct drive condition is established that is fully hydrokinetic. The connection between the crankshaft and the ring gear 34 is established by the torque converter 10.

If only the clutches 52 and 42 are applied and clutch 50 is released, a split torque delivery path is provided through the gear system. Part of the torque is distributed directly to the carrier 40 from the crankshaft 22 through the clutch 52. The balance of the torque is distributed through the torque converter and is distributed to the sun gear 30.

An overdrive condition is established by engaging the brake 48 to anchor the sun gear 32 and by engaging the clutch 52 thereby distributing torque from the crankshaft to the carrier with the sun gear 32 acting as a reaction member.

Reverse drive is achieved by engaging simultaneously brake 46 and clutch 50. With the carrier acting as a reaction member, turbine torque is distributed to the sun gear 32 and ring gear 34 is driven in a reverse direction.

The final drive gearing 14 includes a driving gear 54 connected directly to the ring gear 34. A final drive output gear 56 is drivably connected to the driving gear 54 through an idler gear 58 journalled on a fixed axis.

In FIG. 2 the clutches and brakes have been designated by the symbols $CL_1$ through $CL_5$ and the overrunning coupling 44 is designated by the symbol OWC. Corresponding symbols are applied to the schematic diagram of FIG. 1 where the brake 46 is designated $CL_1$, brake 48 is designated $CL_2$, clutch 50 is designated $CL_3$, clutch 42 is designated $CL_4$ and clutch 52 is designated $CL_5$.

As seen in FIG. 3A the converter is surrounded by the housing 28. Housing 28 is bolted to the cylinder block of the internal combustion engine for the vehicle. Housing support wall 60 is bolted or otherwise secured to internal shoulder 62 in the housing portion 28. Wall 60 is integral with the support sleeve 26 for the stator. A turbine sleeve shaft 64 is supported by bushing 66 in the stationary sleeve 26. Turbine hub 68 is splined at 70 to the sleeve shaft 64 as shown in FIG. 3A. A central drive shaft 72 extends through sleeve 64 and is splined at 74 to the hub of impeller shell 76 for the impeller 16. Shell 76 is connected through drive plate 78 to engine crankshaft 22.

Turbine sleeve shaft 64 is connected at 80 to sleeve shaft 82 which forms a part of or is connected to clutch drum 84. The drum 84 defines an annular cylinder 86 which receives annular piston 88. Clutch plates 90 are splined to sun gear 30 and clutch discs 92 are splined to clutch drum 84. When pressure is admitted to the cylinder 86, piston 88 transmits a force through Belleville spring lever 94 to the clutch discs and plates, thereby establishing a connection between the turbine and the sun gear 30.

Carrier 40 is connected through drive shell 96 to clutch drum 98 rotatably journalled and supported on the right hand end of the shaft 72. Drum 98 defines an annular cylinder 100 which receives an annular piston 102.

Clutch 52 includes friction clutch plates 104 and clutch discs 106 splined, respectively, to the shaft 72 and to the interior of the drum 98. When the annular cylinder 100 is pressurized, a driving connection is established through the clutch 52 between shaft 72 and the carrier 40. Clutch 52 is engaged, as explained previously, during overdrive operation and during operation in the direct drive modes designated in FIG. 2 as drive modes (3A) and (3C).

Overrunning coupling 44 is situated between the drum 98 and end cover 108. The coupling 44 includes rollers 110 which are adapted to engage cam surfaces on the outer race 112 of the coupling 44 to establish a braking action in one direction during low speed operation.

The friction brake 46 includes friction plates 114 and friction discs 116 which are splined respectively to the drum 98 and to the housing portion designated by reference numeral 118. An annular cylinder 120 disposed in the housing receives an annular piston 122 which engages the friction discs and plates 116 and 114 when pressure is admitted to the cylinder 120. Brake 46 is applied whenever hill braking in the low speed ratio range is desired. It is also engaged during reverse drive operation as explained previously.

Clutch 50 is applied to connect the shafts 64 and 82 during operation in direct drive and during reverse drive as explained previously. Clutch 50 comprises clutch drum 124, which defines an annular cylinder 126. Piston 128 is received in the cylinder 126 and is adapted to frictionally engage clutch plates 130 and clutch discs 132 for the clutch 50 to establish a connection between shafts 64 and 82 whenever the cylinder 126 is pressurized. Clutch plates 130 are splined to the shaft 64 and clutch discs 132 are splined to the interior of the clutch drum 124.

Friction brake 48 includes brake plates 134 and brake discs 136 are splined, respectively, to the drum 124 and to the interior of a brake member 138 formed on the support wall 60. Member 138 defines an annular cylinder 140. Annular piston 142 is located within the cylinder 140 and effects clutching engagement of the brake discs and brake plates for the brake 48 whenever it is pressurized.

The housing 118 portion is bolted at its margin 144 to the right hand end of the housing 28. Housing 118 includes an enlarged portion 146 that encloses a hydraulic governor 148 and final drive gearing 14. Drive gear 54 of the final drive gearing 14 is connected directly to ring gear 34. Gear 54 is journalled on stationary sleeve 150.

The idler 58 is journalled by spaced tapered roller bearings 152 and 154 in bearing openings formed in the housing 146.

The governor 148 is defined by a housing or governor body 156 journalled by spaced bearing 158 and 160 in bearing openings formed in the housing 146. A valve opening in the governor body 156 receives a modulating valve element 162 which normally is biased in an inward direction by valve spring 164. Centrifugal force acting on the valve element 162 opposes the spring force and establishes a speed pressure signal that is used by the control circuit for the transmission. The control circuit, in turn, establishes the sequential clutch-and-brake engagement and releases during operation in the various drive modes. Valve body 156 carries a drive gear 165 which engages gear 166 connected to the output gear 54. By locating the governor and the final drive gearing in this strategic location and by arranging clutches and brakes in the compact fashion illustrated in FIGS. 3A and 3B, the overall axial length of the transmission assembly is reduced. The control circuit can be located at the location shown at 168 at the upper side of the housing portion 118. The valve body is closed by a reservoir cover 170.

Having described a preferred form of our invention, what we claim and desire to secure by U.S. Letters Patent is:

1. In a transaxle transmission for a wheeled vehicle with an engine mounted transversely to the centerplane of the vehicle;

a hydrokinetic torque transmitting unit having an impeller connected to said engine and a turbine connected to a turbine sleeve shaft;

multiple ratio gearing comprising two sun gears of different diameter, a ring gear, a set of short pinions engaging the smaller sun gear, a set of long pinions engaging the larger sun gear and said ring gear, said pinions engaging each other and a carrier rotatably supporting said pinions;

said hydrokinetic unit, said engine and said gearing being mounted on a common axis;

final drive gearing located in a transverse plane between said hydrokinetic unit and said multiple ratio gearing;

a driven element of said final drive gearing being mounted for rotation about an axis spaced from and parallel to said common axis;

first and second clutch means for connecting said turbine shaft to said larger sun gear and said smaller sun gear, respectively;

third clutch means for connecting said impeller to said carrier;

first and second brake means for anchoring said carrier and said larger sun gear, respectively;

said first and second clutch means and said second brake means being located between said hydrokinetic unit and said final drive gearing;

said third clutch means and said first brake means being located on the side of said multiple ratio gearing remote from said hydrokinetic unit;

said first clutch means having a torque input portion connected to the torque input portion of said second clutch means and a torque output portion forming a part of said second brake means.

2. The combination as set forth in claim 1 wherein said second brake means is disposed radially outward of said first clutch means and said first brake means is located radially outward of said third clutch means, the torque input portion of said first clutch means comprising a radial friction disc assembly and the torque output portion thereof comprising an annular clutch cylinder;

an annular piston in said cylinder cooperating therewith to define a clutch pressure chamber;

said second brake means comprising a radial brake friction disc assembly carried by said annular clutch cylinder;

a clutch and brake housing between said hydrokinetic unit and said final drive gearing;

said housing defining an annular brake cylinder that is part of said second brake means and an annular brake piston in said brake cylinder adapted to apply a braking force to said brake disc.

* * * * *